(12) United States Patent  
Howard et al.

(10) Patent No.: US 9,111,309 B2
(45) Date of Patent: Aug. 18, 2015

(54) CACHING MULTIPLE VIEWS CORRESPONDING TO MULTIPLE ASPECT RATIOS

(75) Inventors: James Alexander Howard, Mountian View, CA (US); William Bedford Turner, Campbell, CA (US); Christopher Blumenberg, San Francisco, CA (US); Richard Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 376 days.

(21) Appl. No.: 13/495,721

(22) Filed: Jun. 13, 2012

(65) Prior Publication Data

US 2012/0254769 A1    Oct. 4, 2012

Related U.S. Application Data

(62) Division of application No. 12/767,250, filed on Apr. 26, 2010, now abandoned.

(60) Provisional application No. 61/320,661, filed on Apr. 2, 2010.

(51) Int. Cl.
| | |
|---|---|
| *G06F 17/00* | (2006.01) |
| *G06Q 30/06* | (2012.01) |
| *G06F 17/21* | (2006.01) |

(52) U.S. Cl.
CPC .......... *G06Q 30/0621* (2013.01); *G06F 17/211* (2013.01)

(58) Field of Classification Search
CPC ............ G06F 17/04842; G06F 17/211; G06F 17/212; G06F 17/30902; G06F 17/5081

USPC .................................. 715/243, 244, 247, 744
See application file for complete search history.

(56) References Cited

U.S. PATENT DOCUMENTS

| | | | |
|---|---|---|---|
| 5,991,399 A | | 11/1999 | Graunke et al. |
| 6,038,567 A | * | 3/2000 | Young ................................... 1/1 |

(Continued)

FOREIGN PATENT DOCUMENTS

WO    2007/052285    5/2007

OTHER PUBLICATIONS

International Search Report and Written Opinion mailed on May 9, 2011 for PCT/US2010/050207, filed Sep. 24, 2010, titled "Background Process for Providing Targeted Content Within a Third-Party Application," to Apple Inc.

(Continued)

*Primary Examiner* — Laurie Ries
(74) *Attorney, Agent, or Firm* — Novak Druce Connolly Bove + Quigg LLP

(57) ABSTRACT

The present technology presents targeted content, such as a targeted application, in multiple different configurations to correspond to multiple display orientations. In one example, a primary application having a view reserved to present the targeted application is configured to be presented in either a landscape or a portrait presentation format depending on the orientation of the display. The primary application is further configured to switch from either the landscape or portrait presentation format to the other presentation format when the orientation of the display is changed. Accordingly, the targeted application can be downloaded in multiple configurations so that the configuration that is appropriate for the displayed presentation format of the primary application can be presented with the reserved view.

24 Claims, 8 Drawing Sheets

(56) References Cited

U.S. PATENT DOCUMENTS

| | | | |
|---|---|---|---|
| 6,141,010 A * | 10/2000 | Hoyle | 715/854 |
| 6,616,533 B1 | 9/2003 | Rashkovskiy | |
| 6,651,094 B1 * | 11/2003 | Dean et al. | 709/222 |
| 6,807,542 B2 | 10/2004 | Bantz et al. | |
| 7,200,627 B2 | 4/2007 | Stickler | |
| 7,222,078 B2 | 5/2007 | Abelow | |
| 7,231,426 B1 | 6/2007 | Hall et al. | |
| 7,379,063 B2 | 5/2008 | Hoff | |
| 7,385,942 B2 | 6/2008 | Brady et al. | |
| 7,428,555 B2 | 9/2008 | Yan | |
| 7,512,062 B2 | 3/2009 | Brady et al. | |
| 7,620,565 B2 | 11/2009 | Abelow | |
| 7,711,208 B2 * | 5/2010 | Grunder | 382/298 |
| 7,849,459 B2 | 12/2010 | Burkhart et al. | |
| 7,937,672 B2 | 5/2011 | Casto | |
| 7,978,182 B2 * | 7/2011 | Ording et al. | 345/173 |
| 8,132,120 B2 | 3/2012 | Stallings et al. | |
| 2001/0047365 A1 | 11/2001 | Yonaitis | |
| 2003/0037026 A1 | 2/2003 | Bantz et al. | |
| 2004/0015608 A1 | 1/2004 | Ellis et al. | |
| 2004/0088397 A1 | 5/2004 | Becker et al. | |
| 2004/0225647 A1 | 11/2004 | Connelly et al. | |
| 2004/0230676 A1 * | 11/2004 | Spivack et al. | 709/223 |
| 2005/0093891 A1 | 5/2005 | Cooper | |
| 2005/0195735 A1 | 9/2005 | Brady et al. | |
| 2005/0235273 A1 | 10/2005 | Travison et al. | |
| 2005/0240475 A1 | 10/2005 | Margiloff et al. | |
| 2006/0017692 A1 | 1/2006 | Wehrenberg et al. | |
| 2006/0031416 A1 * | 2/2006 | Narin | 709/219 |
| 2006/0074769 A1 | 4/2006 | Looney et al. | |
| 2006/0140141 A1 | 6/2006 | Moon et al. | |
| 2006/0155790 A1 | 7/2006 | Jung et al. | |
| 2006/0195334 A1 | 8/2006 | Reeb et al. | |
| 2007/0033202 A1 | 2/2007 | Casto | |
| 2007/0168462 A1 | 7/2007 | Grossberg et al. | |
| 2007/0229541 A1 | 10/2007 | Klassen et al. | |
| 2007/0266320 A1 * | 11/2007 | Adams et al. | 715/700 |
| 2007/0279387 A1 | 12/2007 | Pletikosa et al. | |
| 2008/0004954 A1 * | 1/2008 | Horvitz | 705/14 |
| 2008/0025307 A1 | 1/2008 | Preiss et al. | |
| 2008/0033997 A1 | 2/2008 | Banker | |
| 2008/0059545 A1 | 3/2008 | Brady et al. | |
| 2008/0065491 A1 | 3/2008 | Bakman | |
| 2008/0071810 A1 | 3/2008 | Casto et al. | |
| 2008/0140720 A1 | 6/2008 | Six et al. | |
| 2008/0143749 A1 | 6/2008 | Weybrew et al. | |
| 2008/0154738 A1 | 6/2008 | Jain | |
| 2008/0208712 A1 | 8/2008 | Yerkes | |
| 2008/0248834 A1 | 10/2008 | Chatterjee et al. | |
| 2008/0254775 A1 | 10/2008 | Rohs | |
| 2008/0275764 A1 | 11/2008 | Wilson et al. | |
| 2009/0002335 A1 * | 1/2009 | Chaudhri | 345/173 |
| 2009/0030982 A1 * | 1/2009 | Spivack et al. | 709/204 |
| 2009/0037239 A1 | 2/2009 | Wong et al. | |
| 2009/0037724 A1 * | 2/2009 | Carion et al. | 713/100 |
| 2009/0043657 A1 | 2/2009 | Swift et al. | |
| 2009/0049407 A1 | 2/2009 | Casto | |
| 2009/0125343 A1 | 5/2009 | Cradick et al. | |
| 2009/0125376 A1 | 5/2009 | Sundaresan et al. | |
| 2009/0135919 A1 | 5/2009 | Vered et al. | |
| 2009/0171847 A2 | 7/2009 | Bhambri et al. | |
| 2009/0171906 A1 | 7/2009 | Adams et al. | |
| 2009/0204476 A1 | 8/2009 | Abraham et al. | |
| 2009/0207138 A1 | 8/2009 | Thorn | |
| 2009/0248537 A1 | 10/2009 | Sarkeshik | |
| 2009/0259941 A1 | 10/2009 | Kennedy, Jr. | |
| 2009/0281874 A1 | 11/2009 | Leblanc et al. | |
| 2009/0289956 A1 | 11/2009 | Douris | |
| 2009/0298480 A1 | 12/2009 | Khambete et al. | |
| 2009/0324100 A1 | 12/2009 | Kletter et al. | |
| 2010/0017385 A1 | 1/2010 | Wilcox et al. | |
| 2010/0049608 A1 | 2/2010 | Grossman | |
| 2010/0060664 A1 | 3/2010 | Kilpatrick et al. | |
| 2010/0066643 A1 | 3/2010 | King et al. | |
| 2010/0153831 A1 | 6/2010 | Beaton | |
| 2010/0169790 A1 | 7/2010 | Vaughan et al. | |
| 2010/0179991 A1 | 7/2010 | Lorch et al. | |
| 2010/0235733 A1 * | 9/2010 | Drislane et al. | 715/702 |
| 2010/0281458 A1 * | 11/2010 | Paladino et al. | 717/106 |
| 2010/0312824 A1 | 12/2010 | Smith et al. | |
| 2010/0317332 A1 | 12/2010 | Bathiche et al. | |
| 2010/0317371 A1 | 12/2010 | Westerinen et al. | |
| 2011/0016427 A1 | 1/2011 | Douen | |
| 2011/0054834 A1 | 3/2011 | Partridge et al. | |
| 2011/0087529 A1 * | 4/2011 | Angell | 705/14.13 |
| 2011/0125755 A1 | 5/2011 | Kaila et al. | |
| 2011/0177774 A1 | 7/2011 | Gupta et al. | |
| 2011/0177775 A1 | 7/2011 | Gupta et al. | |
| 2011/0202947 A1 | 8/2011 | Gupta et al. | |
| 2011/0202966 A1 | 8/2011 | Gupta et al. | |
| 2011/0209181 A1 | 8/2011 | Gupta et al. | |
| 2011/0210922 A1 | 9/2011 | Griffin | |
| 2012/0054664 A1 | 3/2012 | Dougall et al. | |
| 2012/0210259 A1 | 8/2012 | Bederson et al. | |

OTHER PUBLICATIONS

H. Federrath, O. Berthold, M. Kohntopp and S. Kopsell, "Tamkappan Fuers Internet Verfahren Zur Anonymen Und Unbeobachtbaren Kommunikation", CT Magazin Fuer Computer Technik, Heise Zeitschriften Verlag, Hannover, DE, No. 16, Jul. 31, 2000.

Joris Claessens, Bart Preneel and Joos Vandewalle, "Solutions for Anonymous Communication on the Internet," Security Technology, 1999. Proceedings. IEEE 33rd Annual 1999 International Carnahan Conference on, Madrid, Spain, Oct. 5-7, 1999, pp. 298-303, IEEE, Piscataway, NJ, USA, Oct. 5, 1999.

Judd, Christopher M. et al., "Web Packaging and Deployment", Pro Eclipse JST: Plug-ins for J2EE Development, Ch. 14, Apress, Berkeley, CA pp. 241-261, Sep. 8, 2005.

* cited by examiner

CACHING MULTIPLE VIEWS CORRESPONDING TO MULTIPLE ASPECT RATIOS

CROSS REFERENCE TO RELATED APPLICATIONS

This application is a divisional of U.S. patent application Ser. No. 12/767,250, filed on Apr. 26, 2010, which claims the benefit of U.S. Provisional Patent Application No. 61/320,661, entitled "CACHING MULTIPLE VIEWS CORRESPONDING TO MULTIPLE ASPECT RATIOS", filed on Apr. 2, 2010, and which is hereby expressly incorporated herein by reference in its entirety.

FIELD

The following relates to presenting a first application within a second application and more specifically relates to caching multiple views of the second application.

BACKGROUND

Some displays can be rotated from a first orientation into a second orientation. When the display is rotated, the device must redraw the objects and windows on the screen to fit the new orientation. In the instance of larger displays, such rotation is often not an issue because there is enough display area that objects and windows that are not optimally shaped or sized for the rotated display can still be easily viewed. However, in the instance of smaller displays, such as those on handheld computing devices, e.g., smart phones, PDAs, or small computers and tablets, etc., an object or window that is not optimized for the display can be quite awkward.

To compensate for these smaller displays, application developers intending for their applications to be displayed on such devices, cause their applications to entirely redraw their interface to be optimized for the present display. However, this can cause problems for other applications running on the screen or even within the redrawn application itself.

SUMMARY

Accordingly, the present technology presents targeted content, such as a targeted application, in multiple different configurations to correspond to multiple display orientations. In one example, a primary application having a view reserved to present the targeted application is configured to be presented in either a landscape or a portrait presentation format depending on the orientation of the display. The primary application is further configured to switch from either the landscape or portrait presentation format to the other presentation format when the orientation of the display is changed. Accordingly, the targeted application can be downloaded in multiple configurations so that the configuration that is appropriate for the displayed presentation format of the primary application can be presented with the reserved view.

The present technology presents a primary application having a reserved view or window within which targeted content can be displayed. The primary application can be any application for any purpose, however, in many embodiments of the technology the primary application is a third-party application.

In many cases, the developer of the primary application desires to have targeted content presented within the primary application to enrich the experience of the user or to present advertising. However, the primary focus of most developers is on presenting their content in an optimized way given the device's display. In many cases, this requires providing the primary application in a presentation format that is designed for the display. If the display orientation can change, for example from portrait to landscape, or among multiple different aspect ratios, this requires providing the primary application in several presentation formats, each designed for a different orientation or aspect ratio of the display.

In designing the multiple different presentation formats of the primary application, it is often the case that the size, shape, orientation, and/or aspect ratio of the view reserved for the targeted application within the primary application will also be different. Accordingly, the targeted application must be able to fit the multiple views corresponding to the multiple presentation formats of the primary application.

This can be accomplished by providing targeted applications having multiple configurations. When a targeted application is requested from the primary application, the primary application can specify attributes of the targeted application including basic content information, and size(s), shape(s), and aspect ratio(s) for which the targeted application should be configured.

An application server can receive a request for the targeted application, determine the most suitable application, and return data regarding the application back to the primary application. The primary application can then download the targeted application specified by the data received from the application server in configurations correlated to the view(s) of the primary application.

The targeted application can be displayed in a first configuration, correlated to the presentation format of the primary application. If the presentation format of the primary application changes, the targeted application can switch to a second configuration correlated to the new presentation format of the primary application.

In some embodiments of the technology, the targeted application can be an HTML application, such as an HTML5 application, video, game, puzzle, advertisement, image or any other suitable application.

In some embodiments of the technology, a banner looking like the targeted application can be initially downloaded and presented in place of the targeted application while the targeted application completes downloading. This can be desirable to quickly fill in the view reserved for the targeted application while the application completes downloading.

DESCRIPTION

The technology described herein relates to presenting a targeted application within a primary application whereby the targeted application can be identified using a background process to access sensitive data that must be treated with due care appropriate to its sensitive nature.

The background process works as a daemon to respond to requests for a targeted application from the primary application. The daemon can have access to sensitive information that should not be shared with third-party applications and using the sensitive data, it can determine which targeted application should be returned to the primary application.

Such sensitive data can be application-targeting data, which can be used to deliver content that is targeted to a user of a device. The application-targeting data can include information about the device or about the user. For example, application-targeting data can include information identifying: the type of the device, applications loaded or running on the device, preferences, frequently viewed websites, frequently used applications, global positioning system data (GPS data), the operating system, etc. Due to the sensitive nature of much of this data, it is important that this data not be shared with third-party developers who could misuse the data or whose applications might be more vulnerable to hacking than an operating system. It is important to note, that while the operating system has access to this data, most operating system developers take great care to divorce these characteristics from the user itself to keep the individual user as anonymous as possible. It is a preferred aspect of the present technology that the identity of the user remains anonymous while still accessing enough data to provide properly targeted material.

Figure 1:
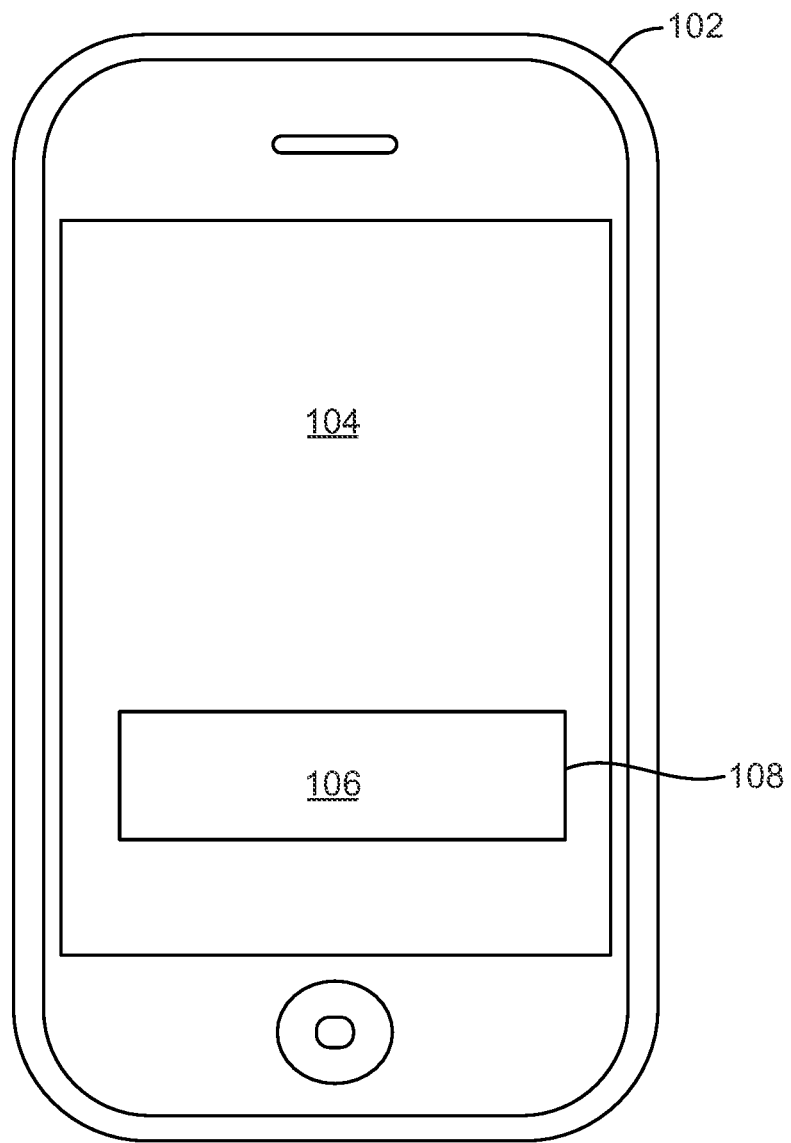
FIG. 1 illustrates an exemplary display presenting a targeted application within a primary application.

FIG. 1 illustrates an exemplary device 102 displaying a primary application 104 and a targeted application 106 in a view 108 within the primary application 104. As illustrated, the device 102 is a handheld computing device, for example, a smart phone, e.g., an IPHONE, by Apple Inc. of Cupertino, Calif. However, the device 102 can be any computing device such as a personal computer, laptop, or personal media-playing device; even a household appliance having a processor and a display can be used with the present technology.

The primary application 104 can be any application that reserves a view 108 or a window or a frame to display a second application 106. In some embodiments, the view has a standard dimension that is consistent across all potential primary applications. In some embodiments, the view 108 occupies about ten percent of the available screen area. Of course, the targeted application can occupy any desired portion of the primary application. However, the area of the targeted application should not be so large as to obscure or detract from the primary application, yet the targeted application should be large enough to view and interact with. Accordingly, the targeted application could be between one and sixty percent of the available screen area.

The targeted application 106 can be any application having content that is created with an audience in mind and can be targeted to that audience. For example, the application can be a game for children; a web application targeted at sports fans; or an advertisement for home improvement products targeted at home owners. In some preferred embodiments, the targeted application 106 can have some relationship to the primary application 104, such as a similarity in the target demographic for the audiences of both applications or in the nature of the content of the applications, etc.

Figure 2:
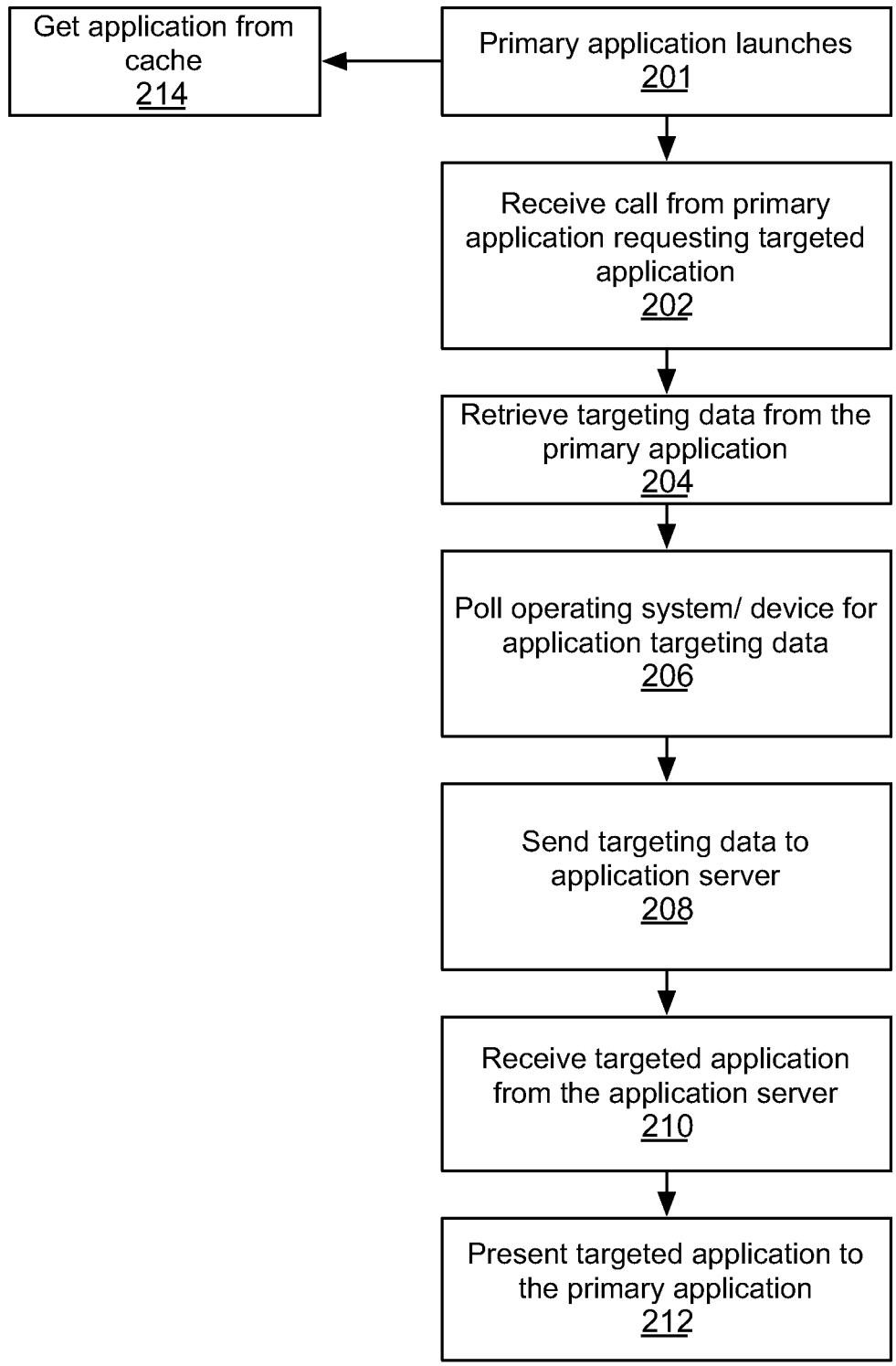
FIG. 2 is a flowchart illustrating a method embodiment for receiving a targeted application based on targeting data.

FIG. 2 illustrates an exemplary method embodiment for providing the targeted application for presentation within the primary application. When the primary application launches, it requests a targeted application for display in the view reserved for the targeted application and the request is received by a background process (202), a daemon.

The daemon has access to and collects various information to be used in determining which targeted application to provide to the primary application. This information, called targeting data, is collected from the application and the operating system.

The daemon receives some targeting data directly from the primary application (204). For example the primary application requests a targeted application that can fit reserved views of specified dimensions and/or number of views. The primary application can also request applications that meet other specifications, e.g., specifications such as content type (sports applications, retail applications, educational applications, etc.), target demographic information, etc. In some embodiments these specifications can be sent by the primary application as part of the request for a targeted application while in some embodiments these specifications can be sent in a separate communication.

Additionally, the daemon polls the operating system for additional targeting data (206). Since the daemon is a background process that is part of the operating system, it has access to a variety of targeting data that can be used to determine the optimum content to display to a user. This data can include user preferences, such as configuration preferences; it can also include data identifying specific applications installed or running on the device, or more general information about the applications identifying applications by broad category; it can include information identifying the primary application requesting the targeted application; it can include past internet search terms, topics extracted from electronic communications; it can include network information such as network state, roaming information, type of connection such as 3-G, 2-G, wi-fi, connection speeds, etc., and carrier information; it can include general user information such as country of residence, home zip code, phone number area code, language preferences, keyboard configuration, and parental restrictions; it can include device information such as screen dimensions, screen resolution, hardware capabilities, a device ID, etc.; it can include data extracted from a social network profile, for example what groups or applications the user is a member of, etc., or from an online store profile; and it can include other targeting data. The daemon can also have access to various hardware components of the device and can access targeting data such as GPS locations. In short, since the daemon is part of the operating system, it is deemed trusted enough to learn targeting data, some of which can be considered sensitive information, for the limited use of determining the optimum targeted content. While some examples of targeting data are listed above, they should not be considered limiting, but rather exemplary for the purposes of providing a fuller explanation of the present technology.

User protection and privacy is a primary concern, and one of the many benefits of the present technology is the protection of the user's sensitive information while gaining the benefit of using the data to determine the optimum content to display to a specific user. Among other protections provided by the present technology, the daemon can be trusted to not share any identifying information. The user's identity is separate from the targeting data used in selecting the targeted applications and not shared, thus keeping the user associated with the targeting data anonymous.

As introduced above, the daemon can learn of the primary application's identity from the operating system. While the primary application can send this information directly to the daemon in its request for a targeted application, in some environments, it is more desirable for the daemon to positively identify the application from the operating system itself. For example, in a system wherein all applications on the device originated from an associated store, the daemon can positively identify the application because the application comes from the store and is therefore highly likely to be correctly identified. Some stores cryptographically sign each application and include a unique key to identify the application. Every message sent by one application to another application on the device must identify itself with this key. In such systems each application can know with confidence that the calling application is as it appears, which makes the device more secure. Additionally, because the store is the source of the application, the store will often have more detailed information regarding the application and this data is not subject to manipulation by the software developer. Correctly identifying the application enables the application server to provide better targeted applications, to avoid presenting another ad for this same application to the user, and to track payments to the developer of the application.

The targeting data can be sent to an application server (208) to determine which targeted application should be presented to the user. The daemon can communicate with the application server using any suitable protocol, but in some embodiments, the daemon and the application server communicate via https. The application server can process the received targeting data using algorithms engineered for the purpose of selecting the targeted application. Importantly, the application server never learns the identity of the user, although it will use information about the user in determining the content to deliver to the user.

Once the application server determines which content to deliver to the user, it can send the content to the device and the daemon thereon. The daemon receives metadata describing the targeted application (210) and forwards the metadata to the primary application. The primary application then downloads the targeted application specified by the metadata and by storing the targeted application in a cache specific to the primary application. The primary application can then present a targeted application stored in its cache in the view field within the primary application (212).

Operating in this manner, the primary application can always present a targeted application that is already stored in its cache without calling the daemon. As illustrated in FIG. 2, when the primary application is launched (201) it can immediately display one of the targeted applications stored in its cache (214). If there are multiple targeted applications stored in the cache, the targeted application can present them in a round-robin fashion.

However, it is not desirable to allow the primary application to only retrieve a targeted application once and then always display it from the cache. Targeted applications can have limited life spans, or restrictions on the number of times the application can be presented. Such restrictions may be tied to the life of the targeted application or to only one session of the primary application. When the primary application requires a new targeted application it will request the targeted application from the daemon (204) as described above.

In some embodiments the application server can determine that multiple targeted applications should be sent to the device. In such embodiments, the first targeted application that is downloaded will be the first targeted application presented in the primary application.

In summary, the daemon functions as a proxy for the application server. The daemon receives requests for targeted applications and forwards targeted applications to the primary application. However, because the daemon is a process of the operating system it is also ideally suited to mine data that is needed by the application server to select the best targeted content for presentation in the primary application.

In addition to the proxy-like functions already described, in some embodiments the daemon can have additional proxy-like attributes. In such embodiments, targeted applications can be stored in a device-wide cache. The daemon can be configured to have limited logic, usually reserved for the application server, to select a targeted application from the pool of targeted applications stored in the device-wide cache. The targeted applications in a device-wide cache would include all applications downloaded from the application server over a certain period irrespective of which primary application for which the targeted applications were originally intended.

Figure 3:
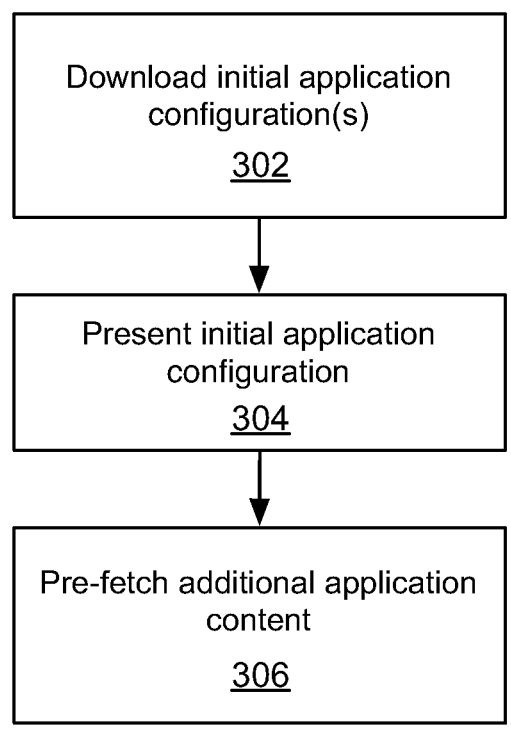
FIG. 3 is a flowchart illustrating a method embodiment for downloading the targeted application and initial views thereof.

FIG. 3 illustrates a process for downloading the full content of the targeted application that balances the competing interests of immediately displaying content so that the reserved view is not left blank with presenting a fully operational and interactive application. Initially, a static view of the targeted application is downloaded (302) and displayed (304).

In some embodiments, the targeted application can have more than one basic application configuration. Multiple basic configurations can be used, for example, in situations where the primary application can be presented in multiple presentation formats, e.g., landscape or portrait views corresponding to the availability of landscape and portrait orientations of the device display. In such embodiments, one or both of the basic application configurations can be initially downloaded (302).

After the initial application configuration has been downloaded it is displayed within the primary application (304). Initially, the targeted application displays as a static banner, the rest of the application content has been optimistically pre-fetched (306) the targeted application is available for full interaction.

While only a small portion of the targeted application is displayed, it can be interactive and full of rich content. The additional content can be pre-fetched so that the targeted application can present a functional user interface immediately upon being selected and then download additional resources as the user requests them by interacting with the application.

This method of downloading the targeted application overcomes some of the drawbacks related to serving the targeted application from a remote server. By initially downloading the initial application configurations, content is quickly made available for display on the device. This minimizes the possibility that the targeted-application view will be left blank while the full content is downloaded. The full content of the application is further downloaded and cached so that future interaction with the application will not be delayed by additional downloading operations. The application is optimistically downloaded so that all of the content is available immediately.

Figure 4:
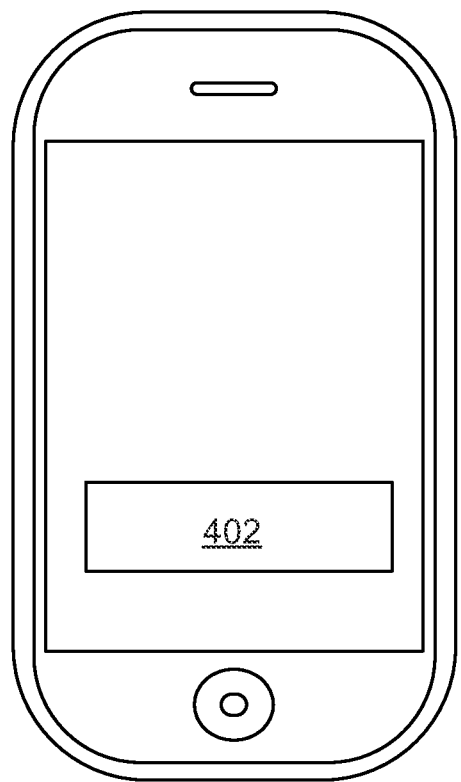
FIG. 4 illustrates multiple views of the targeted application corresponding to portrait and landscape display orientations.
Figure 4:
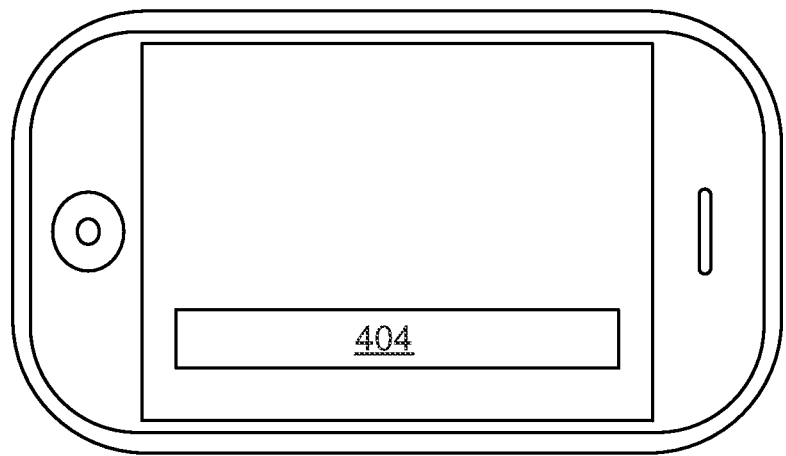

As mentioned above, multiple application configurations can be downloaded if the device has multiple possible presentation formats, such as portrait and landscape. In such aspects, it is anticipated that a view in portrait will not be as desirable in landscape. In some embodiments, it is desired that the targeted-application view and corresponding targeted-application configuration occupy only about ten percent of the display. As illustrated in FIG. 4, the targeted-application view in the portrait view (402) is fatter but thinner than the targeted-application view in the landscape view (404). Both views take up only about ten percent of the available screen area.

When the device is in a first orientation, for example a portrait orientation, and then rotates to a second orientation, for example a landscape orientation, the targeted-application view can resize along with the rest of the primary application, and the targeted-application configuration for that orientation can be displayed. When the device is rotated into a different orientation, the primary application will react to the change in orientation by rotating its view and resizing itself according to the new orientation. Along with this process, the primary application can present an alternate configuration for the targeted application that corresponds to the current orientation of the device which was downloaded along with the targeted application. In other words, a primary application that can be displayed in both landscape and portrait orientations will download a targeted application that can fit both orientations. When the device is rotated, the targeted application changes shape and animates to show content appropriate to the new aspect ratio. The content is still the same targeted application; it just has a slightly different representation for the new aspect ratio.

Figure 5:
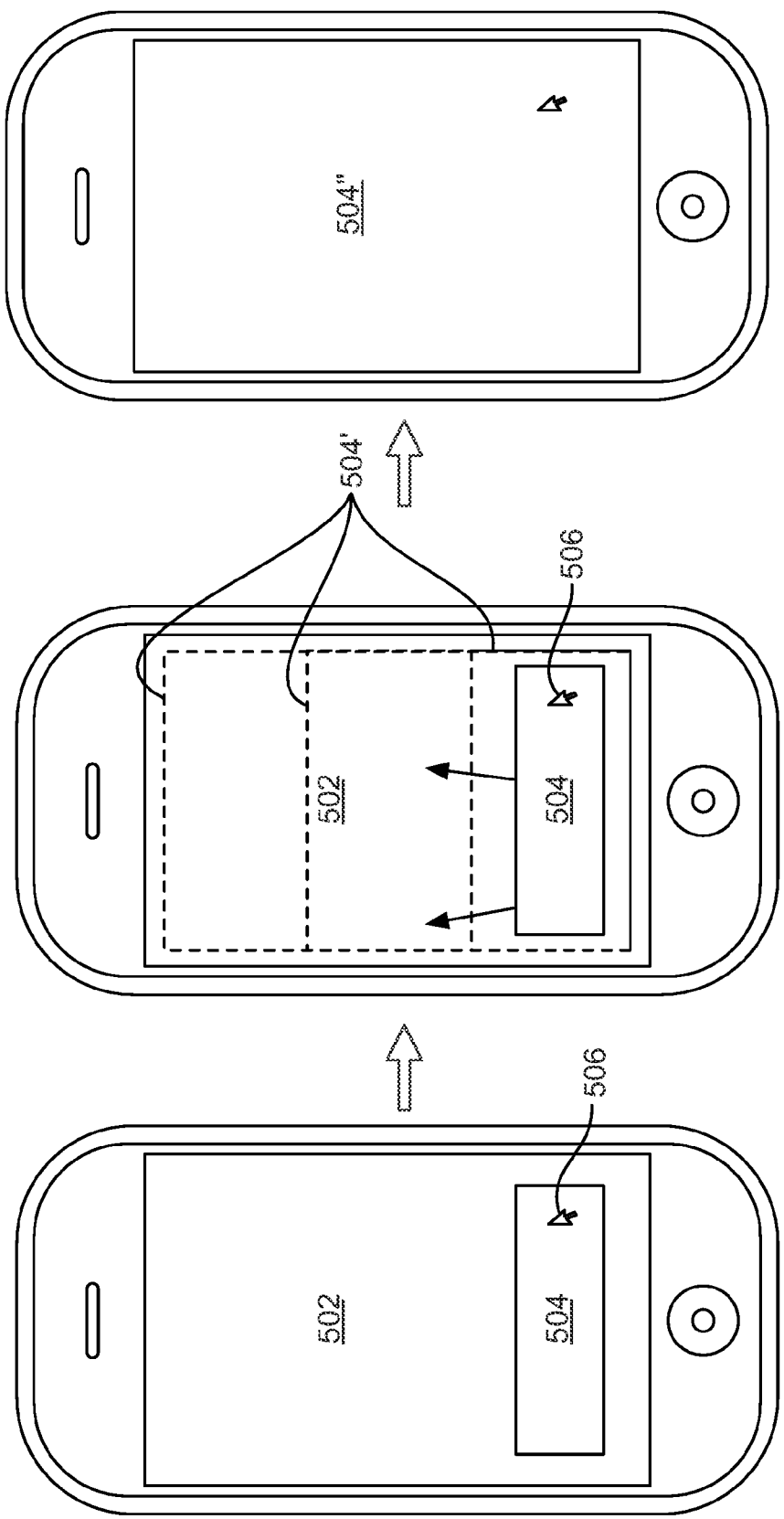
FIG. 5 illustrates a banner image for the targeted application that is a portion of the full screen view of the targeted application and a transition from the banner to the full screen view.

Except while the targeted application is being downloaded, the targeted application can be interactive. As illustrated in FIG. 5, the targeted application (504) can be selected using a pointing device (506). In the illustrated embodiment, the device has a touch screen input and thus a finger touch is illustrated, although any other selection mechanism is acceptable. Upon selection, the targeted application expands (504') to reveal its full view. In some embodiments, such as the embodiment illustrated in FIG. 5, the targeted application can be shown in a reduced view or a full view. At the left of FIG. 5, the targeted application is shown in a reduced view (504), while at the far right the full view (504") is illustrated. Upon selecting the reduced view (504), the targeted application morphs into its full view. The morphing is illustrated in the middle of FIG. 5 with 504' illustrating the transition between the reduced view (504) and the full view (504"). In other words, targeted applications can include banner images such that the targeted application shown in the primary application is a slice of a larger image that is seamlessly revealed when selected. This full screen targeted application provides the full interactive content of the targeted application.

In some aspects of the technology, the targeted application either advertises products for purchase or links to an online store to purchase products. In such aspects of the technology, it is undesirable to have the user navigate away from the application because such additional steps reduce the likelihood that a sale will be converted. Accordingly, the present technology provides for allowing a user to purchase products outside of the targeted application, while maintaining the appearance that the user is still operating within the targeted application.

Figure 6:
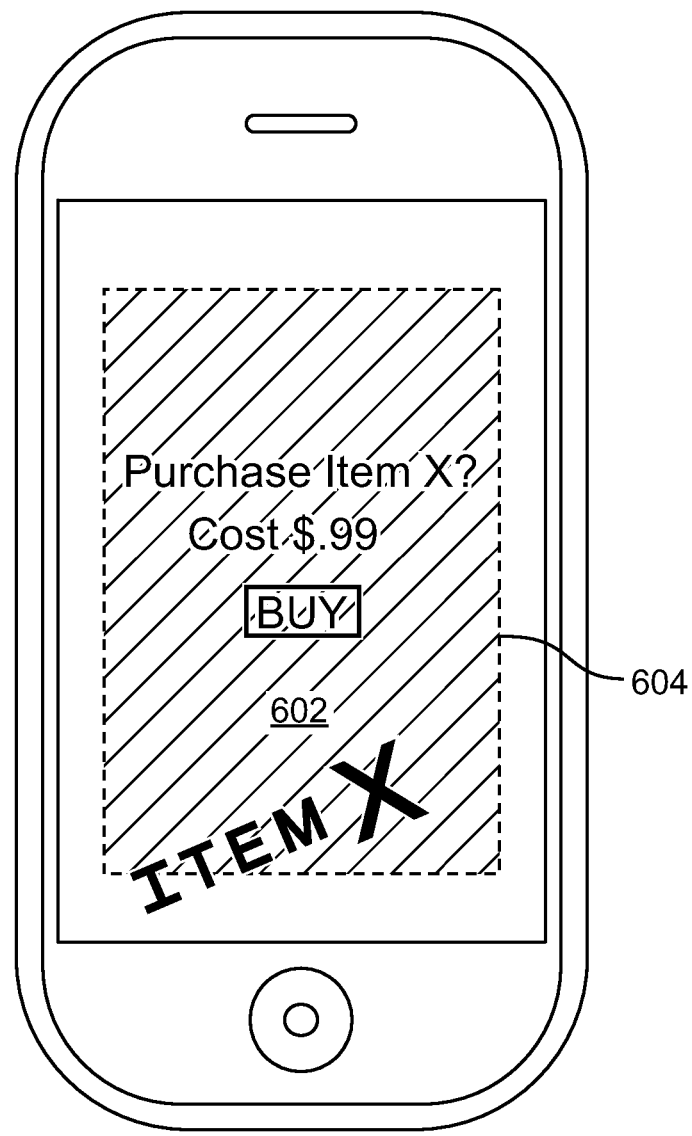
FIG. 6 illustrates a point-of-sale embodiment without navigating away from the targeted application.

FIG. 6 illustrates an exemplary user interface for allowing a user to purchase a product outside of the targeted application while the user experience maintains the appearance of being within the targeted application. As illustrated, the targeted application (602) is advertising ITEM X (a hypothetical item for purchase), which the user has selected to purchase. A purchase interface (604) is further shown overlaid the targeted application. In some embodiments, the purchase interface (604) is translucent or has transparent portions so that the targeted application (602) remains at least partially visible through the purchase interface. While the purchase interface (604) looks like it is part of the targeted application (602), it is really an extension of an online store. As an example, ITEM X could be a media item such as a movie or music, which is available for purchase from an online store, such as ITUNES, by Apple Inc., of Cupertino, Calif. In such an example, the targeted application could be a game or video or advertisement relating to the media item. The media item is not sold by the targeted application; it is sold by the online media store. Accordingly, the purchase interface is an extension of the online store and can be used to allow the user to purchase the media item from the store. To the user, it as though they bought the media item from the targeted application.

Figure 7:
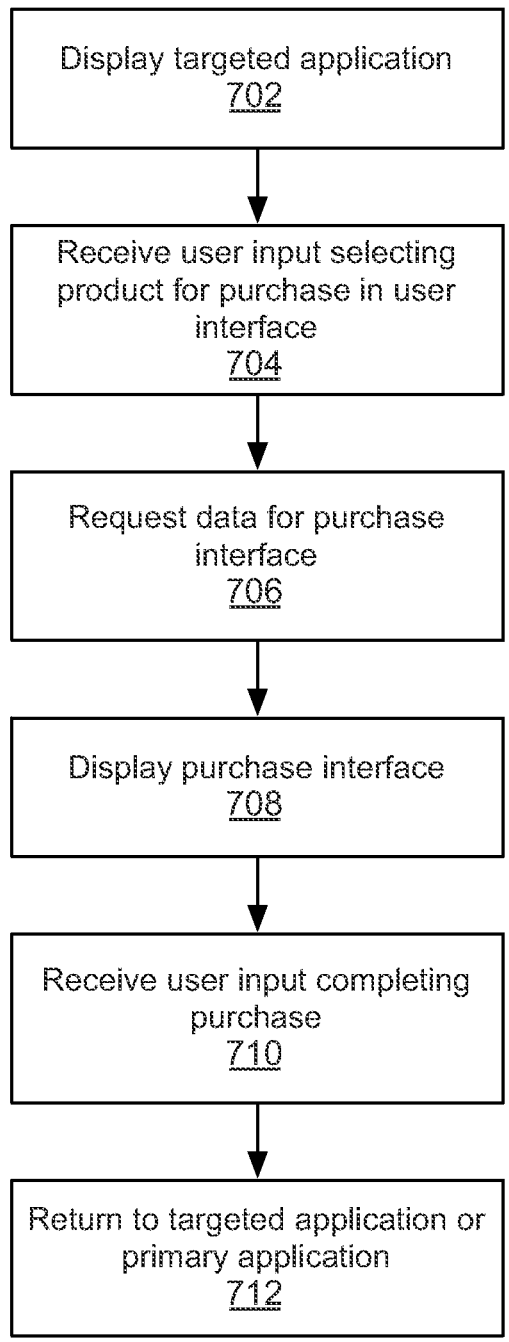
FIG. 7 is a flowchart illustrating a method embodiment for completing the sale of a product without navigating away from the targeted application.

FIG. 7 illustrates an exemplary method for providing a point of purchase that appears to be within the targeted application. The targeted application is displayed on the device and it advertises a product for sale (702). If a user wishes to purchase the item, the user can select the product for purchase using an input device and the input is detected by the system (704). Responsive to the received user input, the system can request data needed to provide a purchase interface (706). In some embodiments, the data needed to provide the purchase interface includes data representing the entire purchase interface, while in some embodiments it includes data representing information used to fill out fields in a template purchase interface.

Whether a template purchase interface is used with data from the store, or a purchase interface sent by the store is used, the purchase interface is displayed overlaid the targeted application (708). As addressed above, in some embodiments, the purchase interface is displayed as a substantially translucent or transparent interface so that at least portions of the targeted application can be seen through the purchase interface.

Receiving user inputs effective to complete the purchase completes the purchase (710). Responsive to those inputs, the system can communicate the confirmed purchase with the online store. The purchase interface can be removed and the user is returned to the targeted application or the primary application (712).

The targeted application can be a program, applet, image, object with hyperlinks, html application, video, flash object, etc. It can be for any purpose including, gaming, video, web interaction, advertising, document preparation, presenting, etc.

In some embodiments, the targeted application is an HTML5 web application for the purpose of advertising. In such embodiments, the primary application can call the operating system requesting an advertisement to be displayed in the view reserved for that purpose in the primary application. The operating system can use a daemon to collect advertisement targeting information that can be sent to an advertising server which can select and serve an advertisement that is best suited for display to the specific user in that primary application.

The device can download initial banner views of the advertisement suitable for display in any display orientation, which the primary application is expected to run. For example, the primary application might be expected to run in a portrait and a landscape orientation and, accordingly, the device will download the advertisement banners to be initially displayed.

The banners for portrait and landscape orientation can be standard sizes, which, in some embodiments, should not take up more than ten percent of the display area. When the orientation of the device changes from portrait to landscape or landscape to portrait, the banner corresponding to the orientation will be loaded and displayed.

The device can thereafter download the HTML5 version of the advertisement that contains interactive features to enrich the user's experience with the advertisement. Additionally, the device can preload a web archive of additional content associated with the ad so that the advertisement can present its full functional advertisement content without waiting for the additional content to be downloaded. However, it may be necessary or desired to download some content upon request.

In some embodiments, the banner, which is initially displayed, is actually only a small portion of the full targeted-advertisement application. When a user selects the banner, the full advertisement can be displayed. In such embodiments, an animation can show the banner portion of the targeted-advertisement application grow into the full advertisement, or the animation can show the primary application being pulled back to reveal the full ad. Other animations are possible. It is also possible that the banner is just a link to the full targeted-advertisement application, which can be loaded upon selection of the banner.

The full targeted-advertisement application can have a variety of interactive functions. The advertisement can present a game, information, or any other desired content. The advertisement can also provide a point of purchase for one or more advertised items. While it will most commonly be the case that the advertisement is providing a link to an online store that is the entity actually selling the advertised items, to the user, it looks as if the advertisement is the entity selling the item because the user will not have to leave the advertisement to complete the purchase.

When a user desires to purchase an advertised product, the user can select the product from the advertisement. The advertisement can request information to complete a purchase interface, or can request a purchase interface directly from the store. The purchase interface can be displayed directly in, or above, the advertisement program and thus the purchase is completed without navigating away from the advertisement program.

The present technology also protects the operating system and the primary application from unstable and malicious targeted applications by running the targeted application as a separate process. In some embodiments, the targeted application is run in a virtual machine type environment or given access to limited resources. In some embodiments, the targeted application is run in a sandbox so that it cannot effect the primary application or operating system. Running the targeted application in a sandboxed environment allows the targeted application to crash or freeze and be quit without effecting the primary application. It also prevents the targeted application from including malicious content or extracting data from the primary application.

Figure 8:
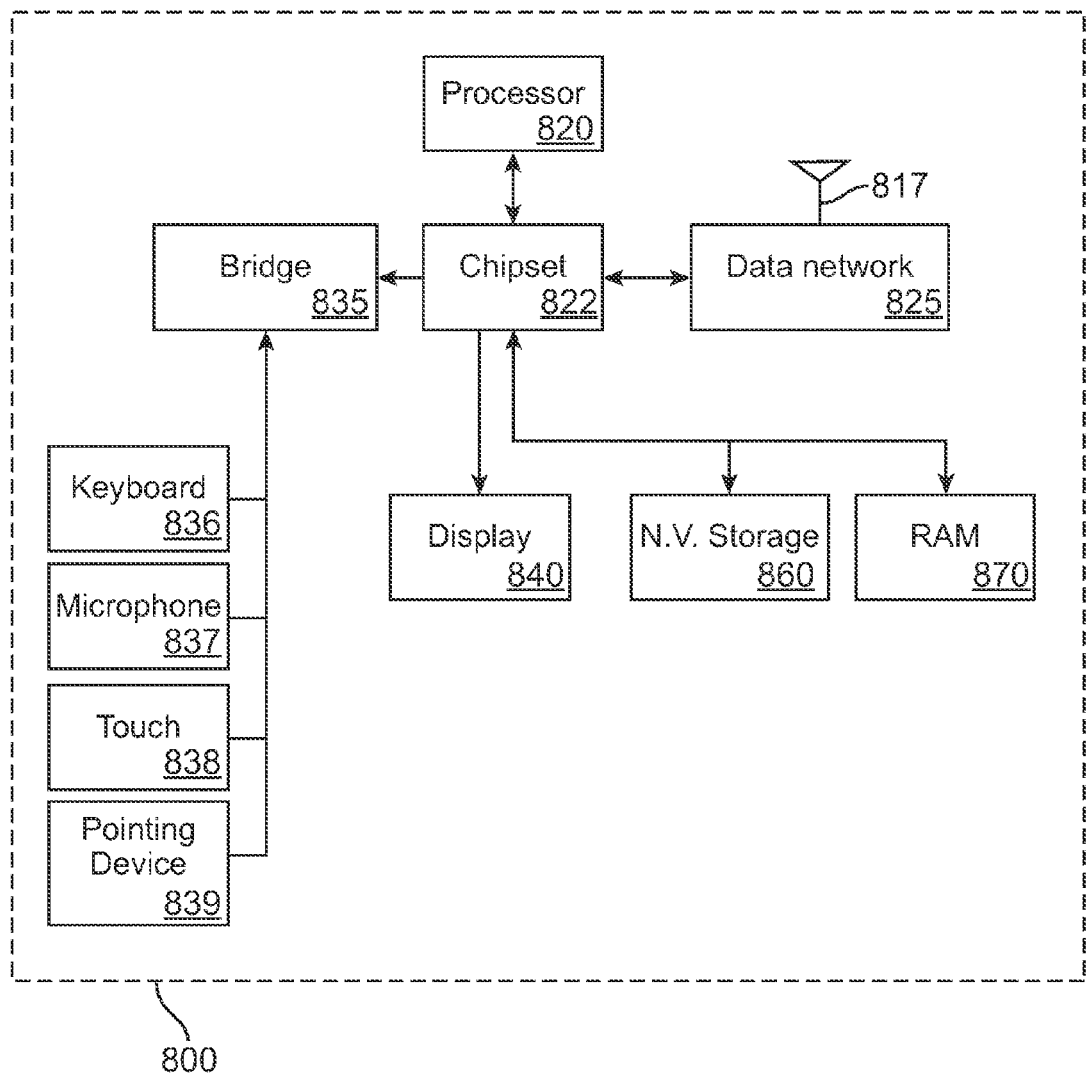
FIG. 8 is a schematic illustration of an exemplary system embodiment.

FIG. 8 illustrates a computer system 800 used in executing the described method. Computer system 800 is an example of computer hardware, software, and firmware that can be used to implement disclosures above. System 800 includes a processor 820, representative of any number of physically and/or logically distinct resources capable of executing software, firmware, and hardware configured to perform identified computations. Processor 820 communicates with a chipset 822 that can control input to and output from processor 820. In this example, chipset 822 outputs information to display 840 and can read and write information to non-volatile storage 860, which can include magnetic media and solid-state media, for example. Chipset 822 also can read data from and write data to RAM 870. A bridge 835 for interfacing with a variety of user interface components can be provided for interfacing with chipset 822. Such user interface components can include a keyboard 836, a microphone 837, touch detection and processing circuitry 838, a pointing device, such as a mouse 839, and so on. In general, inputs to system 800 can come from any of a variety of sources, machine-generated and/or human-generated.

Chipset 822 also can interface with one or more data network interfaces 825 that can have different physical interfaces 817. Such data network interfaces can include interfaces for wired and wireless local area networks, for broadband wireless networks, as well as personal area networks. Some applications of the methods for collecting data in the location-popularity index and ranking and returning location search results disclosed herein can include receiving data over physical interface 817 or be generated by the machine itself by processor 820 analyzing data stored in memory 860 or 870. Further, the machine can receive inputs from a user via devices 836, 837, 838, 839 and execute appropriate functions, such as browsing functions, by interpreting these inputs using processor 820.

Methods according to the above-described examples can be implemented using computer-executable instructions that are stored or otherwise available from computer-readable media. Such instructions comprise, for example, instructions and data which cause or otherwise configure a general purpose computer, special purpose computer, or special-purpose processing device to perform a certain function or group of functions. Portions of computer resources used can be accessible over a network. The computer executable instructions may be, for example, binaries, intermediate-format instructions such as assembly language, firmware, or source code, including transitory signals carrying the instructions. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A device comprising:
a non-transitory machine-readable medium; and
machine-executable instructions stored on the machine-readable medium for causing a computer to perform operations comprising:
receiving metadata from an application server describing a targeted application for display within a primary application;
downloading a static image of the targeted application in multiple configurations correlated to multiple presentation formats of the primary application;
displaying, within the primary application, the static image of the targeted application in a first configuration from the multiple configurations, wherein the first configuration correlates to a current presentation format of the primary application and wherein the static image of the targeted application presents an interactive portion of the targeted application; and
pre-fetching the targeted application such that the interactive portion of the targeted application presents a fully functional user interface upon being selected.

2. The device of claim 1, further comprising:
switching the current presentation format of the primary application to a new presentation format; and
correspondingly displaying the targeted application in a second configuration that correlates to the new presentation format of the primary application.

3. The device of claim 1, further comprising:
requesting a targeted application from the application server, the request specifying dimensions for the respective configurations of the targeted application.

4. The device of claim 1, wherein each configuration of the targeted application occupies substantially the same area of the primary application.

5. The device of claim 1, wherein banner images having the same appearances as the multiple configurations of the targeted application are initially downloaded and displayed.

6. The device of claim 5, wherein the application is downloaded after the banner images, and once downloaded is presented in place of the banner images.

7. A method comprising:
requesting a targeted application from an application server;
receiving, in response to the request, metadata describing a targeted application for display within a primary application;
downloading a static image of the targeted application in multiple configurations, wherein the multiple configurations correspond to multiple presentation formats of the primary application;
displaying, within the primary application, the static image of the targeted application in a first configuration from the multiple configurations, wherein the first configuration correlates to a current presentation format of the primary application and wherein the static image of the targeted application presents an interactive portion of the targeted application; and
pre-fetching the targeted application such that the interactive portion of the targeted application presents a fully functional user interface upon being selected; and
storing the targeted application in a cache specific to the primary application.

8. The method of claim 7 further comprising:
displaying the targeted application in a configuration that corresponds to a displayed presentation format of the primary application.

9. The method of claim 7, wherein the targeted application stored in the cache has at least one associated restriction regulating when the targeted application can be displayed.

10. The method of claim 9, wherein the at least one associated restriction includes at least one of a maximum life span or a maximum number of times the targeted application can be displayed.

11. The method of claim 7, wherein downloading further comprises first downloading a static view of the targeted application and then replacing the static view when the targeted application is fully downloaded.

12. The method of claim 7, wherein the multiple presentation formats of the primary application correspond to multiple different display aspect ratios.

13. The method of claim 7, wherein the multiple presentation formats include at least one of portrait and landscape.

14. The method of claim 7, wherein the static image of the targeted application is a slice of larger image of the targeted application.

15. The method of claim 7, further comprising:
loading the targeted application wherein the targeted application is loaded upon selection of the static image.

16. The method of claim 7, further comprising:
upon selection of the static image animating the static image growing into a full view of the targeted application.

17. The method of claim 7, further comprising:
closing the targeted application and returning to the primary application.

18. A system comprising:
a communications interface configured to receive metadata describing a targeted application for display within a primary application, the metadata received in response to a request to an application server for a targeted application;
the communications interface further configured to download the targeted application in multiple configurations correlated to multiple presentation formats of the primary application;
a processor configured to display, within the primary application, a static image of the targeted application in a first configuration from the multiple configurations, wherein the first configuration correlates to a first displayed presentation format of the primary application and wherein the static image of the targeted application presents an interactive portion of the targeted application; and
a processor configured to pre-fetch the targeted application such that the interactive portion of the targeted application presents a fully functional user interface upon being selected.

19. The system of claim 18 further comprising:
the processor further configured to store the targeted application in a cache specific to the primary application.

20. The system of claim 18, wherein the processor is further configured to run the targeted application in a sandboxed environment.

21. The system of claim 18, wherein the processor is further configured to display the targeted application in a second configuration corresponding to a second presentation format in response to switching the presentation format of the primary application from the first presentation format to the second presentation format.

22. The system of claim 21, wherein the first presentation format is presented on a display having a portrait orientation, and the second presentation format is presented on the display having a landscape orientation.

23. The system of claim 18, wherein a percentage of display area occupied by the targeted application in the first presentation format is substantially the same as in the second presentation format.

24. The system of claim 18, wherein the request includes targeting data.

\* \* \* \* \*